(12) United States Patent
Nordlund

(10) Patent No.: US 8,783,509 B2
(45) Date of Patent: Jul. 22, 2014

(54) METHOD, A DEVICE AND A SYSTEM FOR METERING OF POWDER

(75) Inventor: Magnus Nordlund, Laxå (SE)

(73) Assignee: Saab AB, Linköping (SE)

( * ) Notice: Subject to any disclaimer, the term of this patent is extended or adjusted under 35 U.S.C. 154(b) by 170 days.

(21) Appl. No.: 13/141,008

(22) PCT Filed: Dec. 19, 2008

(86) PCT No.: PCT/SE2008/051522
§ 371 (c)(1),
(2), (4) Date: Jun. 20, 2011

(87) PCT Pub. No.: WO2010/071523
PCT Pub. Date: Jun. 24, 2010

(65) Prior Publication Data
US 2011/0253740 A1    Oct. 20, 2011

(51) Int. Cl.
*B67B 7/00* (2006.01)
(52) U.S. Cl.
USPC .............. 222/1; 222/63; 222/306; 222/368; 222/439; 222/444; 141/196; 86/31; 86/46
(58) Field of Classification Search
USPC ........... 86/1.1, 24, 29–31, 44–46; 141/71, 73, 141/80, 83, 196; 222/1, 367–370, 305–310, 222/282–289, 55, 63–64, 425, 434, 222/438–440, 444
See application file for complete search history.

(56) References Cited

U.S. PATENT DOCUMENTS

| | | | |
|---|---|---|---|
| 2,352,809 A * | 7/1944 | Strauss | 222/156 |
| 2,550,827 A * | 5/1951 | Lachmiller | 222/308 |
| 3,147,890 A | 9/1964 | Mittelsteadt | |
| 3,311,272 A | 3/1967 | Westbrook | |
| 3,501,053 A * | 3/1970 | Purdie et al. | 222/47 |
| 3,656,518 A * | 4/1972 | Aronson | 141/1 |
| 4,162,751 A * | 7/1979 | Hetland et al. | 222/293 |
| 4,418,606 A * | 12/1983 | Lee | 86/31 |
| 4,890,535 A * | 1/1990 | Bieber | 86/31 |
| 6,382,461 B1 * | 5/2002 | Olsson | 222/1 |

(Continued)

OTHER PUBLICATIONS

PCT/ISA/210—International Search Report—Jul. 27, 2009.
PCT/ISA/237—Written Opinion of the International Searching Authority—Jul. 27, 2009.

(Continued)

*Primary Examiner* — Paul R Durand
*Assistant Examiner* — Andrew P Bainbridge
(74) *Attorney, Agent, or Firm* — Venable LLP; Eric J. Franklin

(57) ABSTRACT

A method, device and system for metering powder material from a powder material source by a metering device connected to the source. The device is charged from the source with a batch of powder material in a charging configuration. The batch is discharged from the device in a discharging configuration. The source is connected with a metering piston space in the charging configuration via a first channel of a fixed metering channel hub. The volume of the space is controlled between a metering piston and a hub peripheral surface by controlling the piston position in the space, to charge the volume with material by gravity. The metering space is turned around the hub, to the charging configuration. The volume filled with material is enclosed until reaching the discharging configuration. The metering piston space is connected with a discharge opening via a second channel of the hub for discharging the material.

18 Claims, 7 Drawing Sheets

(56) References Cited

U.S. PATENT DOCUMENTS

| | | | |
|---|---|---|---|
| 7,631,787 B1* | 12/2009 | Lee | 222/288 |
| 7,690,403 B2* | 4/2010 | You et al. | 141/83 |
| 2008/0105331 A1* | 5/2008 | You et al. | 141/198 |
| 2008/0190514 A1* | 8/2008 | Lee et al. | 141/95 |

OTHER PUBLICATIONS

PCT/IPEA/409—International Preliminary Report on Patentability—Feb. 15, 2011.

Extended European Search Report—Apr. 4, 2013 (Issued in Connection With Counterpart European Patent Application No. 08878987.0).

* cited by examiner

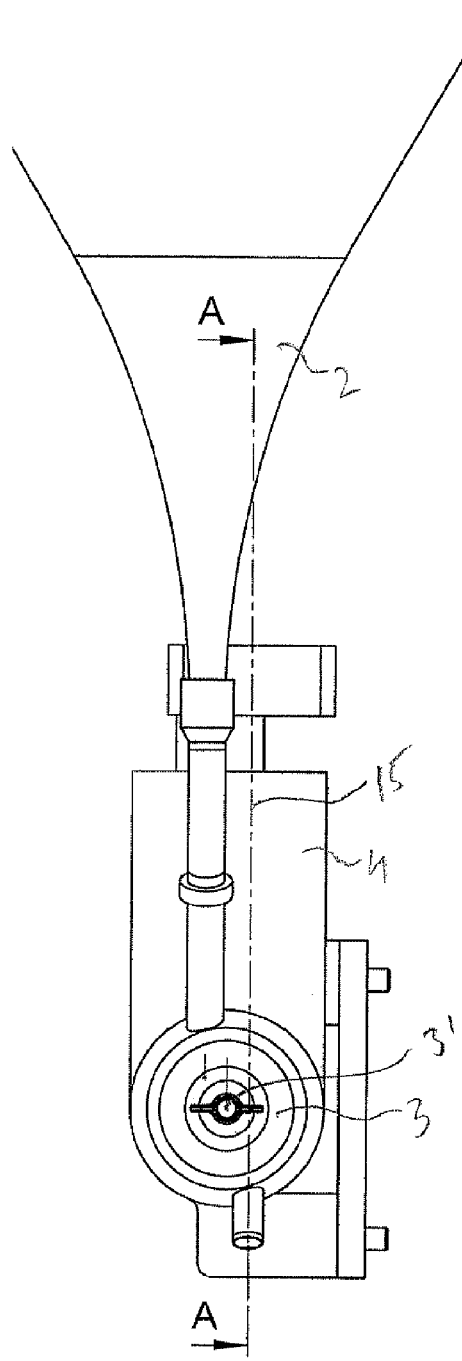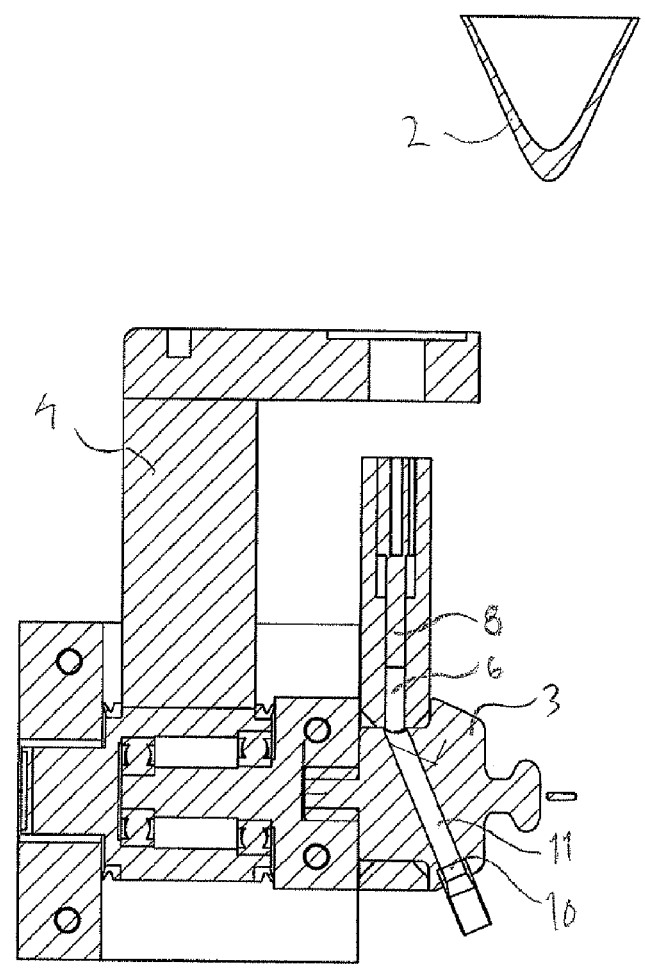
Fig. 4
A-A
Fig. 5

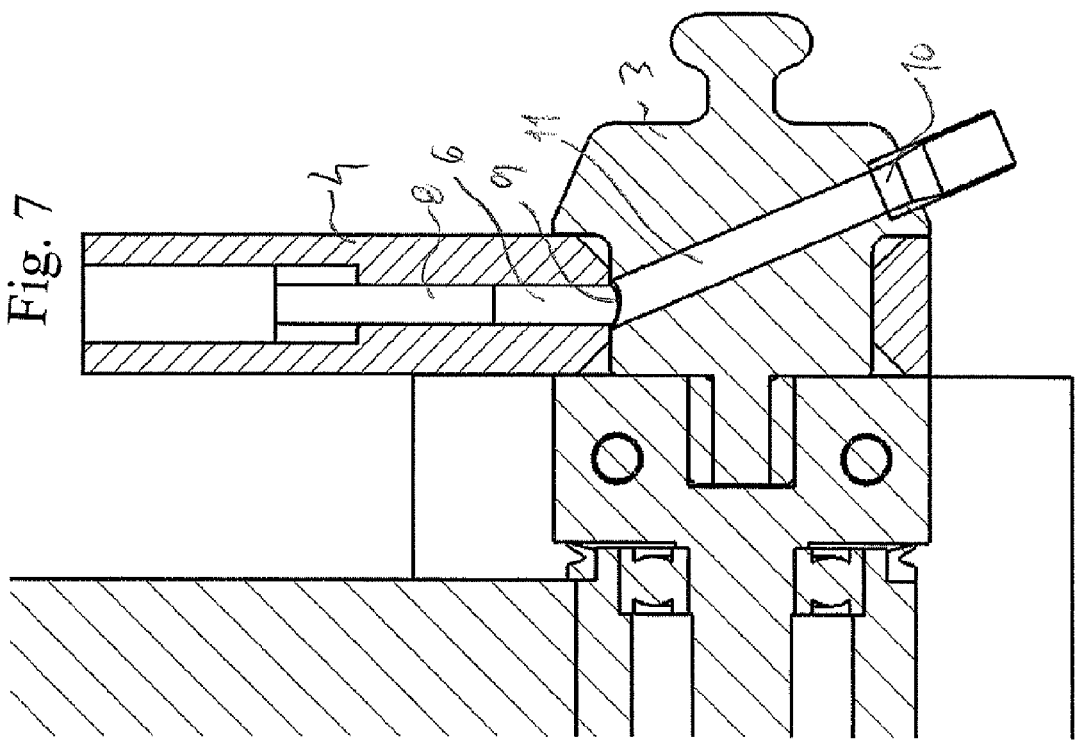
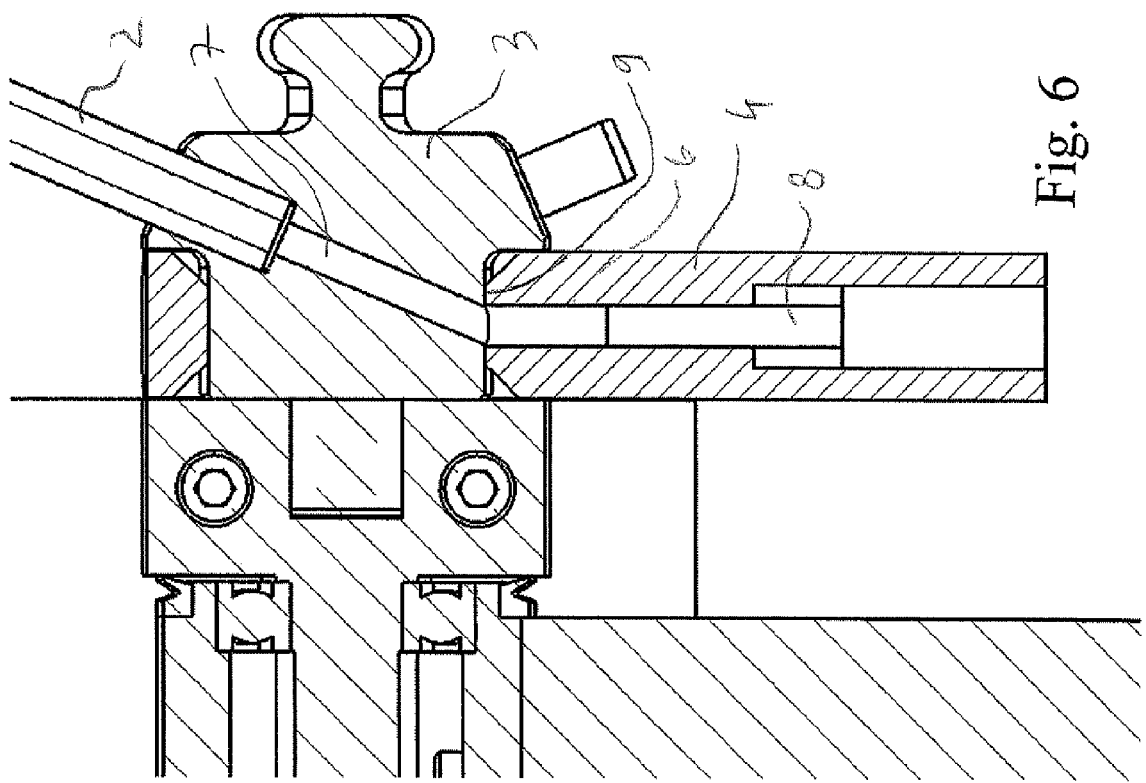

A-A

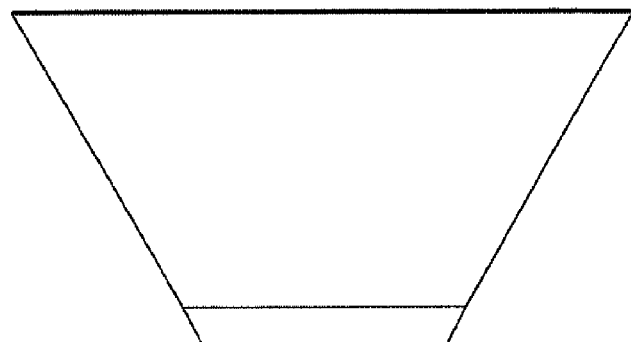
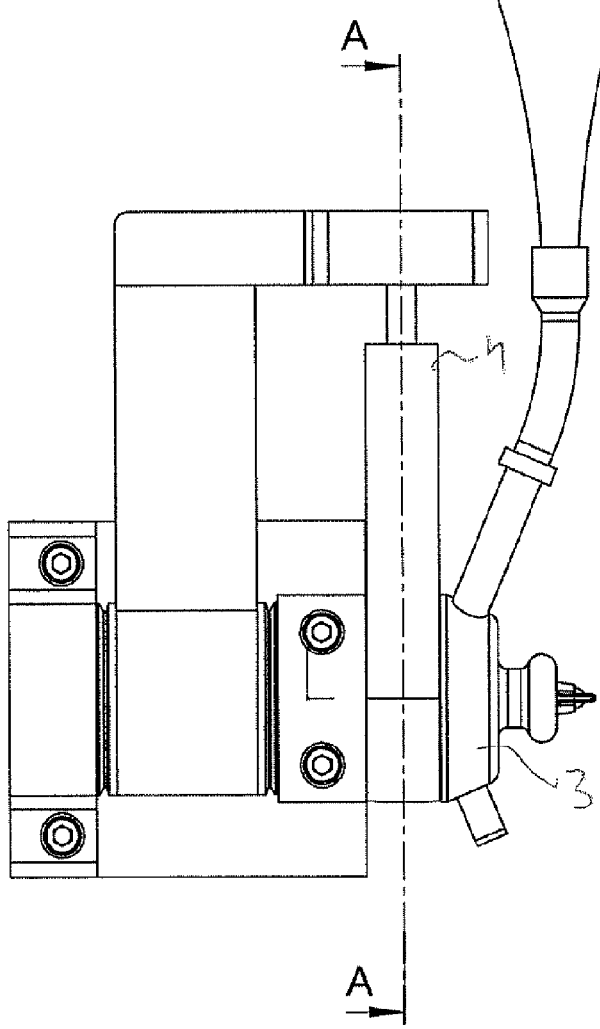
Fig. 10
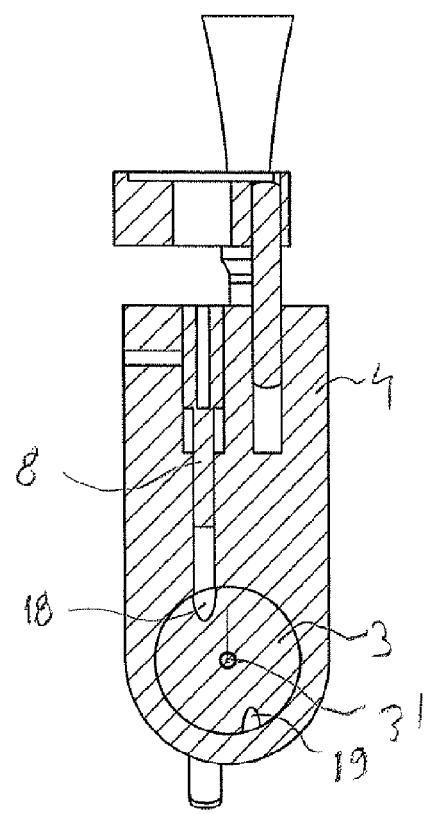
Fig. 11
A-A

US 8,783,509 B2

METHOD, A DEVICE AND A SYSTEM FOR METERING OF POWDER

CROSS-REFERENCE TO RELATED APPLICATIONS

This application is the national phase under 35 U.S.C. §371 of PCT/SE2008/051522 filed 19 Dec. 2008.

BACKGROUND

1. Technical field

The present invention relates to a method for metering of powder.

The present invention also relates to a device for metering of powder.

The present invention further relates to system for metering of powder.

2. Prior art

Technique of the above identified kind is previously known for example metering of explosives in the form of powder. Normally used for very accurate metering of explosives is a technique similar to technique applied in a sugar castor and comprises a number of interconnected channels arranged in different angles in a metering head. When the metering head is rotated 180° a certain amount of explosive from a powder magazine is metered down for e.g. pressing.

A disadvantage with this technique is that the amount metered is difficult to calculate in advance since the technique is such that the angle of repose of the batch of powder is of great importance for the resulting amount metered.

Another disadvantage is that a piston used for metering influences only a minor portion of the volume that is metered.

OBJECT OF THE INVENTION

Thus an object of the present invention is to provide a solution which eliminates these disadvantages.

SUMMARY OF THE INVENTION

The object of the invention is provided by a method and a device for metering powder.

The invention offers the advantages of extremely accurate metering and rapid metering of successive batches of metered powder material using feeding by gravity. According to a preferred embodiment a metering space and a metering piston are arranged in a turnable metering structure offering the advantages of rapid switching between two vertical positions providing a charging configuration and a discharging configuration, respectively, and alternating connections with the metering channel hub.

According to still another preferred embodiment the metering structure is exchangeable which offers the advantage that a plurality of powder material batch volumes ranges may be covered in the device.

According to yet another preferred embodiment the metering channel hub is separately removably arranged which offers the advantages that the device is easily cleaned and the hub may be exchanged for suitable adaptation to the metering structure used.

BRIEF DESCRIPTION OF THE DRAWINGS

A better understanding of the present invention will be had upon reading the following detailed description when read in conjunction with the attached drawings wherein like details have been designated the same designations throughout the many views shown and wherein FIG. 1 schematically shows a perspective view of a first embodiment of a device according to the present invention, FIG. 2 schematically shows a front view of a main part of the device according FIG. 1 seen in the main axial direction of the device, the device being in a charging configuration, FIG. 5 shows a section A-A according to FIG. 4, FIG. 6 shows an enlarged portion of the cross-section of FIG. 3, a charging channel of a metering hub of the device being connected to a powder material source, e.g. a powder material magazine, and a metering piston space of the device according to the invention in a charging configuration, FIG. 7 shows an enlarged portion of the cross-section of FIG. 5, a discharge channel of the metering hub of the device being connected to the metering piston space and a discharge connection, FIG. 8 schematically shows a side view of the device part of FIG. 2 seen from the left in FIG. 2, FIG. 10 shows a side view of the device part of FIG. 4 seen from the left in FIG. 4 and FIG. 11 shows a cross-section A-A according to FIG. 10.

DETAILED DESCRIPTION OF PREFERRED EMBODIMENTS

Figure 1:
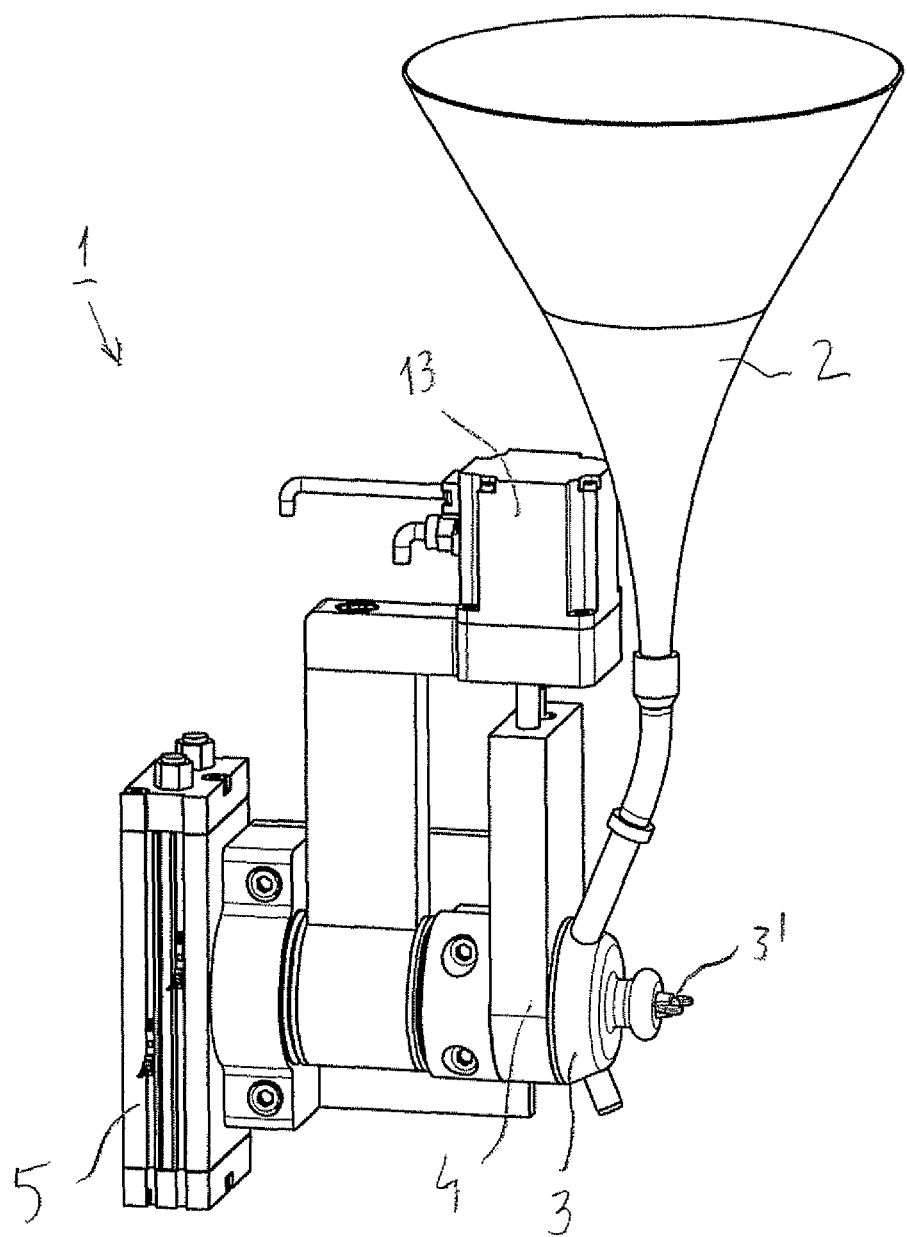
Figure 2:
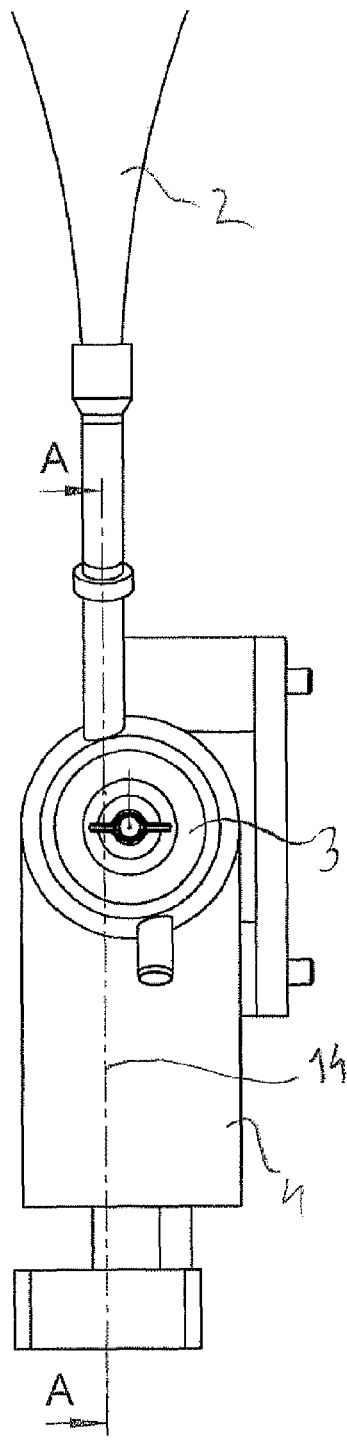
Figure 3:
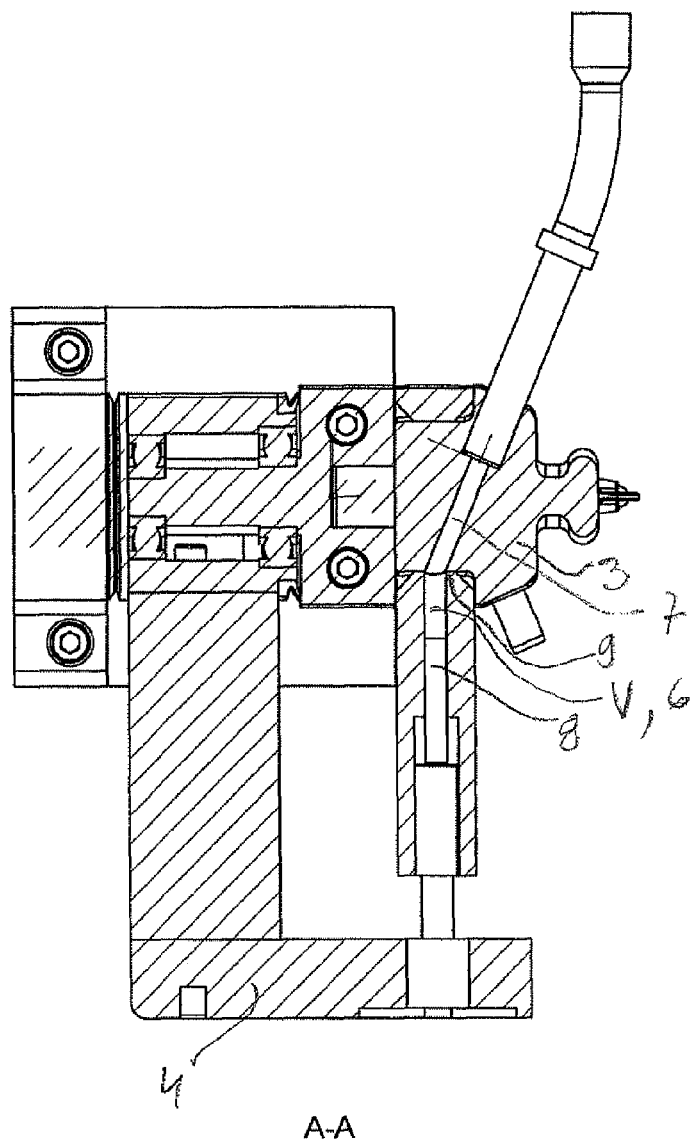
FIG. 3 shows a section A-A according to FIG. 2, FIG. 4 schematically shows a front view of a main part of the device according to FIG. 1 seen in the main axial direction of the device, the device being in a discharge configuration.
Figure 8:
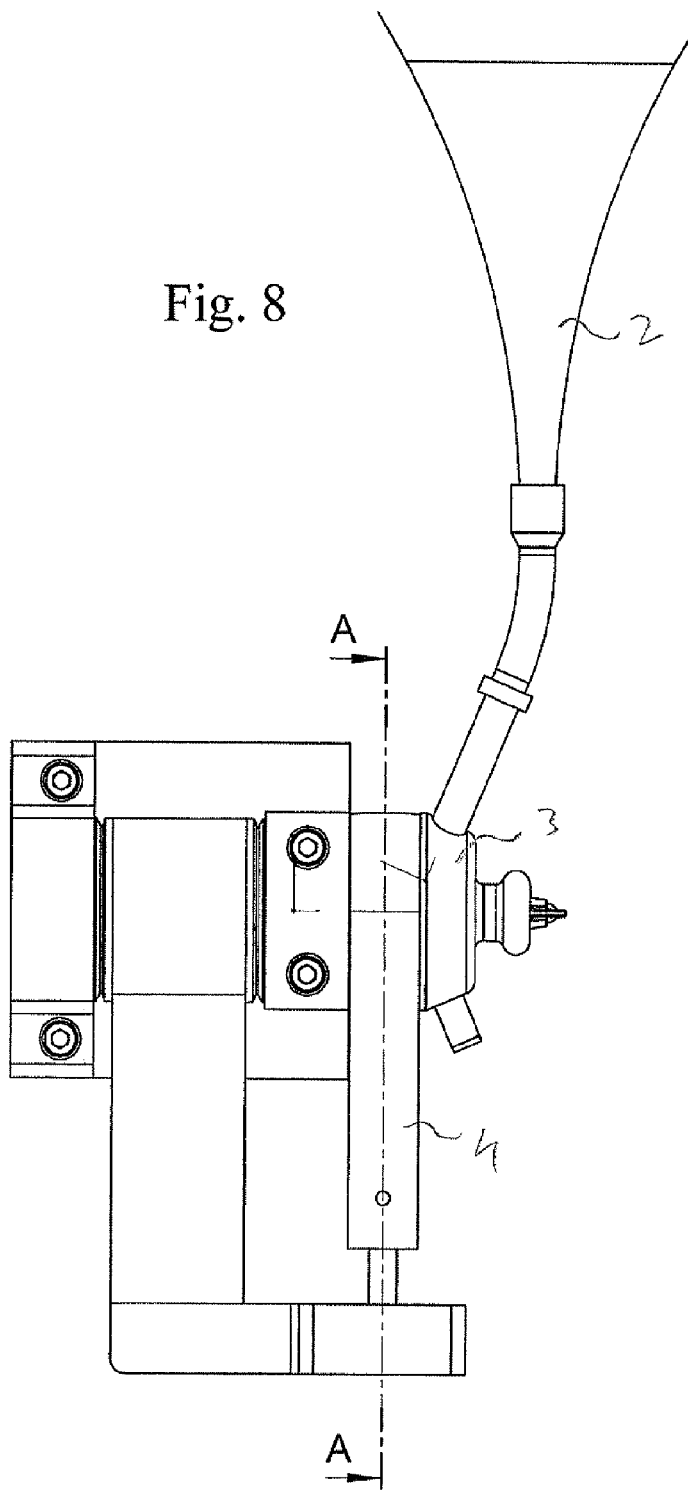
Figure 9:
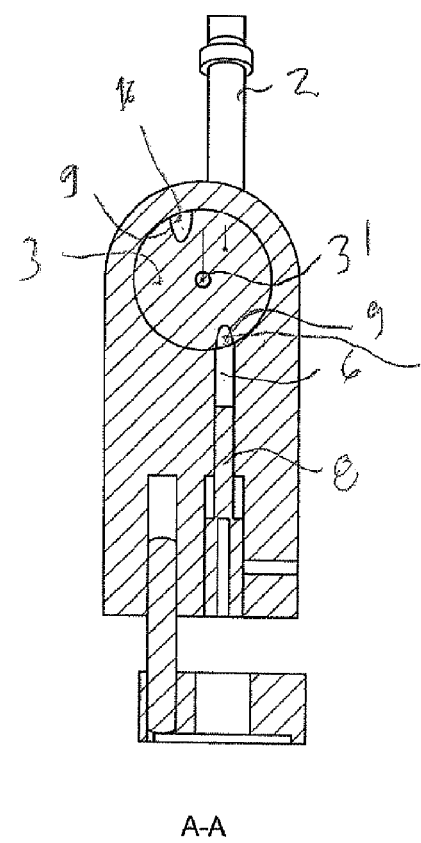
FIG. 9 shows a section A-A according to FIG. 8.

In FIG. 1 a metering device for powder material is designated by 1, powder material being provided from a powder material source 2, the device being arranged to be charged with a batch of powder material from said source in a charging configuration and to discharge said batch in a discharging configuration. In FIG. 1 the discharging configuration is shown.

The metering device comprises a fixed metering channel hub 3 providing a substantially horizontal axis 3' for rotatably carrying a metering structure 4, a turning cylinder arrangement 5 being provided for rotating the metering structure to change configuration as discussed later below.

As shown in e.g. FIGS. 2-5 the device comprises a metering piston space 6 arranged to be connected with said powder material source in the charging configuration via a first channel 7 of the fixed metering channel hub, the volume V of the metering piston space between a metering piston 8 and a hub peripheral surface 9 being controllable by controlling the piston position in said metering piston space.

According to the invention the metering piston space is rotatable around the metering channel hub, the volume of the metering piston space being arranged to be enclosed when leaving the charging configuration by rotation, the piston metering space being arranged to be connected to a discharge opening 10 via a second channel 11 of the metering channel hub in the discharge configuration, the powder material of said enclosed volume being intended to be discharged through said opening, the metering piston space being situated below said first channel in the charging configuration to provide filling of said space with powder material from the powder material source by action of gravity and the metering piston space being situated above the second channel in the discharge configuration to provide discharging of the powder material from the metering piston space through the second channel and said opening substantially by gravity.

According to one embodiment the metering piston is arranged to take part in the discharging of powder material in the discharging configuration by a pushing action towards the second channel and the discharge opening.

According to preferred embodiments the metering piston and the metering piston space are arranged in the metering structure and thus rotatable by the rotatably arranged metering structure, the metering piston being arranged in a preferably cylindrical space 12 in said structure to be moved to and from the metering channel hub.

Further, according to preferred embodiments, the metering structure is rotatable, preferably substantially 180°, between two positions providing the charging configuration and the discharging configuration, respectively, as shown in FIGS. 2-5.

According to a preferred embodiment means, e.g. a servo motor 13, FIG. 1, is provided for automatically controlling the position of the metering piston in the metering piston space, thereby controlling the volume of said space. It may also be imagined that means is provided for manually moving the metering piston in the metering space to preferred positions for adjusting the volume of said space.

Preferred is also that each channel of the metering channel hub e.g. as shown in FIGS. 2-5, runs in a separate, substantially vertical plane 14, 15, the first channel having an upper end 16 connected to the powder material source and a lower end 17 at the hub periphery surface for charging and the second channel having an upper end 18 connectable to the metering piston space and a lower end 19 for discharging of powder material, the channels running in a slope to and from, respectively, said structure.

Further, according to preferred embodiments, the metering channel hub is removably arranged for cleaning etc and for adaption to different metering structures, the metering structure and the metering piston preferably being exchangably arranged for adaption to a desired range of powder material batch volume since the volume range of powder material batches to be metered generally varies between wide limits.

For certain applications a metering device according to the present invention is a part of a system for processing powder material to e.g. pressed components, in which system batches of metered powder material are processed, the system comprising means for detecting, e.g. measuring, the processing result and for, preferably automatically, if necessary, adjusting the metering piston position in response to the detected result in order to obtain a desired result in the following metering step/-s in a feed-back manner.

Figure 12:
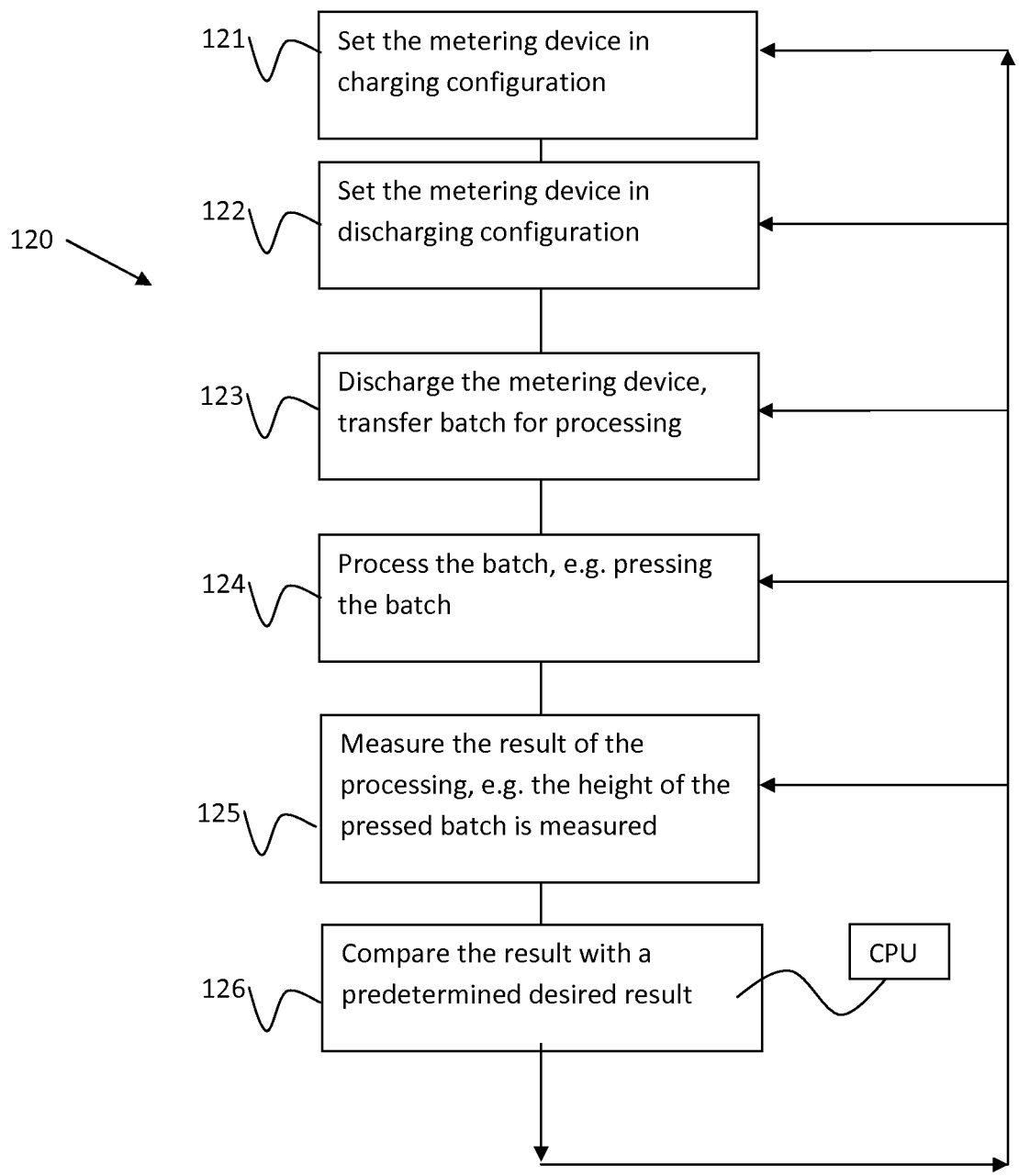
FIG. 12 shows a flow-chart for one embodiment according to the present invention.

In FIG. 12, relating to a system 120 for processing of batches of powder material metered by means of a device according to the present invention, a method utilized by means of the system is schematically shown.

In a first step 121 the metering device is set in a charging configuration, a desired batch volume is set by setting the position of the controllable metering piston in the metering space. The charging configuration may be set from the discharging configuration or from some intermediate rest position and charging is performed by filling the metering space with powder material from the powder material source.

In a second step 122 the device is set in the discharging configuration by rotation. turning, preferably substantially 180°.

In a third step 123 the device is discharged, a batch being transferred for processing.

In a fourth step 124 processing of the batch is performed, the processing in FIG. 12 being pressing as an example.

In a fifth step 125 the result of the processing, is determined, e.g. measured. In the case shown a height of a pressed component or detail is measured.

In a sixth step 126 the determined result is compared to a pre-determined desired result.

If the result is acceptable no adjustment of the metering piston position is performed and another batch of powder material is metered and the steps 121-126 are repeated except for setting the metering piston. If the result is not acceptable a new metering piston position is determined by a central processing unit CPU controlling the system and the operation of the device and the metering piston is set in the new position in step 121.

The method as well as the function of the device and the system according to the present invention should to a substantial and sufficient extent have been made clear above.

Thus, by means of gravity, powder material is passed from the powder material source, magazine via the first channel in the metering channel hub to the metering space, which is filled with powder material from the metering piston and up, the volume of the metering space between the metering piston and the peripheral surface of the metering channel hub, to which the metering space connects at the first channel, lower end in the charging configuration.

When the metering space is filled, charged, which is made very quickly from the moment the metering structure enters the charging configuration, the metering structure comprising the metering space and the metering piston is turned away from the charging configuration towards and to the discharging configuration. In this way an extremely well-defined volume of powder material is metered in the volume of the metering space enclosed between the metering piston and the peripheral surface of the metering channel hub, the metered powder volume being cut off without any heap and angle of repose effects in the border surface between the metering space and the first channel, the volume being determined and controlled by the metering piston position in the metering space.

With a turn of substantially and preferably 180° of the metering structure and, thus, the metering space and the metering piston from the charging configuration to the discharging configuration, said turn being very quick, if desired, the metering space is connected to the upper end of the second channel and the metered batch of powder material is discharged to the discharge opening through the second channel by gravity or by gravity and by action of the metering piston, if desired, the piston position being controllable.

Above, the invention has been described in association with examples and preferred embodiments.

Further embodiments as well as minor changes and additions may of course be imagined.

According to the preferred embodiments the piston position is adjustable by means of the servo motor 13 co-acting with a screw mechanism, not shown, for adjusting and controlling the piston position in the metering piston space, e.g. such that a screw element of the mechanism is arranged to be rotated by means of the motor 13.

According to one embodiment the powder material metered is explosives. However, the invention may be used for e.g. metallic powder materials, ceramic powder materials, mixture of powder materials, powders for solid drugs for the pharmaceutical industry etc.

Thus, the invention, should not be considered to be limited to the embodiments as disclosed above but may be varied within the scope specified by the appended claims.

The invention claimed is:

1. A powder metering method for metering of powder material from a powder material source by a metering device connected to the powder material source, the method comprising:
   charging the device from the powder material source with a batch of powder material in a charging configuration of the device and discharging said batch of powder material from the device in a discharging configuration of the device;
   connecting the powder material source with a metering piston space in the charging configuration via a first channel of a fixed metering channel hub and controlling a volume of said space between a metering piston and a peripheral surface of the fixed metering channel hub by controlling a position of the piston in said space outside the peripheral surface, thereby charging the volume with powder material by gravity;
   rotating the metering space around the fixed metering channel hub and thereby leaving the charging configuration and enclosing said volume filled with powder material until reaching the discharging configuration; and
   connecting the metering piston space with a discharge opening via a second channel of the fixed metering channel hub for discharging the batch of powder material contained in the enclosed volume.

2. The method according to claim 1, further comprising:
   arranging the metering piston and the metering piston space in a metering structure, rotatable around a metering channel hub axis between two positions providing the charging configuration and the discharging configuration, respectively.

3. The method according to claim 2, further comprising:
   rotating the metering structure substantially 180° between said two positions.

4. The method according to claim 1, further comprising:
   using the metering piston when discharging.

5. The method according to claim 1, further comprising:
   further processing of the discharged batch of powder material and detecting a processing result; and
   adjusting the position of the piston in response to said result to obtain a desired result in the further processing.

6. The method according to claim 1, further comprising:
   controlling the metering piston position automatically.

7. The method according to claim 1, further comprising:
   manually adjusting the metering piston position.

8. The method according to claim 1, further comprising:
   exchanging the metering structure and the metering piston depending upon a desired range of powder material batch volume.

9. The method according to claim 1, wherein the batch of powder material contained in the enclosed volume is discharged by gravity.

10. The method according to claim 5, wherein the further processing comprising pressing the batch of powder material.

11. A powder metering device for powder material provided from a powder material source, the device being arranged to be charged with a batch of powder material from said powder material source in a charging configuration and to discharge said batch of powder material in a discharging configuration, the device comprising:
    a metering piston space arranged to be connected with said powder material source in the charging configuration via a first channel of a fixed metering channel hub, a volume of the metering piston space between a metering piston and a peripheral surface of the fixed metering channel hub being controllable by controlling the piston position in said metering piston space outside the peripheral surface, the metering piston space being rotatable around the fixed metering channel hub, the volume of the metering piston space being arranged to be enclosed when leaving the charging configuration, the piston metering space being arranged to be connected to a discharge opening via a second channel of the fixed metering channel hub in the discharge configuration, the batch of powder material of said enclosed volume being intended to be discharged through said opening, the metering piston space being situated below said first channel in the charging configuration to provide filling of said space with powder material from the powder material source by action of gravity and the metering piston space being situated above the second channel in the discharge configuration to provide discharging of the batch of powder material from the metering piston space through the second channel and said opening.

12. The device according to claim 11, further comprising:
    a metering structure rotatable around the fixed metering channel hub and comprising the metering piston and the metering piston space.

13. The device according to claim 12, wherein the structure is rotatable between two positions providing the charging configuration and the discharging configuration, respectively.

14. The device according to claim 11, further comprising:
    an automatic control configured to automatically control the position of the metering piston in the metering piston space, thereby controlling the volume of said metering piston space.

15. The device according to claim 12, wherein each channel of the fixed metering channel hub runs in a separate, substantially vertical plane, the first channel having an upper end connected to the powder material source and a lower end at the peripheral surface of the fixed metering channel hub for charging and the second channel having an upper end connectable to the metering piston space and a lower end for discharging of the batch of powder material, the channels running in a slope to and from, respectively, said structure.

16. The device according to claim 12, the metering structure and the metering piston are exchangably arranged for adaption to a desired range of a volume of the batch of powder material.

17. A system for metering and processing powder material, the system comprising:
    a metering device comprising a metering piston space arranged to be connected with said powder material source in a charging configuration via a first channel of a fixed metering channel hub, a volume of the metering piston space between a metering piston and a peripheral surface of the fixed metering channel hub being controllable by controlling a position of the piston in said metering piston space outside the peripheral surface, the metering piston space being rotatable around the fixed metering channel hub, the volume of the metering piston space being arranged to be enclosed when leaving the charging configuration, the piston metering space being arranged to be connected to a discharge opening via a second channel of the fixed metering channel hub in a discharge configuration, at batch of the powder material of said enclosed volume being intended to be discharged through said opening, the metering piston space being situated below said first channel in the charging configuration to provide filling of said space with the batch of the powder material from the powder material source by action of gravity and the metering piston space being situated above the second channel in the discharge configuration to provide discharging of the batch of the powder material from the metering piston space through the second channel and said opening;

a batch processor configured to process the batch of the powder material metered by said device; and a determining module configured to determine a result of the processing, compare the result with a desired result and control the position of the metering piston in the metering space, if necessary, in order to obtain the desired result in at least one processing step.

18. The system according to claim 17, wherein the processing comprises pressing and wherein said result is the height of a pressed batch of powdered material.

* * * * *